(12) United States Patent
Subramanian et al.

(10) Patent No.: US 9,094,335 B2
(45) Date of Patent: Jul. 28, 2015

(54) PACKET SWITCHING LABEL ASSIGNMENT ACROSS MULTIPLE PACKET SWITCHING FORWARDING GROUPS

(75) Inventors: Karthik Subramanian, San Jose, CA (US); Dheerendra Talur, San Ramon, CA (US); Pradosh Mohapatra, Fremont, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 13/031,746

(22) Filed: Feb. 22, 2011

(65) Prior Publication Data

US 2012/0213225 A1 Aug. 23, 2012

(51) Int. Cl.
*H04L 12/56* (2006.01)
*H04L 12/723* (2013.01)
*H04L 12/713* (2013.01)

(52) U.S. Cl.
CPC .............. *H04L 45/50* (2013.01); *H04L 45/586* (2013.01)

(58) Field of Classification Search
CPC ...................................................... H04L 12/28
USPC ........................................ 370/390, 389, 408
See application file for complete search history.

(56) References Cited

U.S. PATENT DOCUMENTS

| 7,468,956 | B1 * | 12/2008 | Leelanivas et al. | 370/255 |
|---|---|---|---|---|
| 7,522,603 | B2 * | 4/2009 | Vasseur | 370/392 |
| 2003/0012189 | A1 * | 1/2003 | Nomura et al. | 370/389 |
| 2005/0265308 | A1 * | 12/2005 | Barbir et al. | 370/351 |
| 2006/0200579 | A1 * | 9/2006 | Vasseur et al. | 709/238 |
| 2012/0275338 | A1 | 11/2012 | Filsfils et al. | |

OTHER PUBLICATIONS

Cisco et al. (hereinafter referred as Cisco) "BGP PIC edge for IP and MPLS-VPN," Jul. 23, 2010 (20 pages).*
Rekhter et al., "Carrying Label Information in BGP-4," May 2001, RFC 3107, http://datatracker.ietf.org/doc/rfc3107, The Internet Society, Reston, VA, USA (eight pages).
"BGP PIC Edge for IP and MPLS-VPN," Jul. 23, 2010, http://www.cisco.com/en/US/docs/ios/iproute_bgp/configuration/guide/irg_bgp_mp_pic.pdf, Cisco Systems, Inc., San Jose, CA, USA (twenty pages).

* cited by examiner

*Primary Examiner* — Dang Ton
*Assistant Examiner* — Mewale Ambaye
(74) *Attorney, Agent, or Firm* — The Law Office of Kirk D. Williams (57) ABSTRACT

In one embodiment, a packet switching device assigns a same particular packet switching label to each particular route of a plurality of particular routes having the same one or more best paths, wherein the plurality of particular routes includes routes from at least two different forwarding groups. A forwarding group is defined as a specific route, one or more routes associated with a same customer edge router, or one or more routes associated with a single virtual routing and forwarding domain (VRF). The packet switching device advertises to other packet switching device(s) to add this same particular label to packets having one of the plurality of particular routes, which they do. The packet switching device then packet switches packets based on the particular label received in a label field in a header of these packets.

21 Claims, 9 Drawing Sheets

LABEL ASSIGNMENT
DATA STRUCTURE
USED IN ONE
EMBODIMENT OF A
PACKET SWITCHING
DEVICE
430

| | 431 | 432 | 433 |
|---|---|---|---|
| 1 | LABEL-1 | BEST PATHS - 1 (E.G., PRIMARY AND ONE OR MORE BACKUP PATHS) | SET OF ROUTES - 1 |
| 2 | LABEL-2 | BEST PATHS - 2 (E.G., PRIMARY AND ONE OR MORE BACKUP PATHS) | SET OF ROUTES - 2 |
| ⋮ | ⋮ | ⋮ | ⋮ |
| N | LABEL-N | BEST PATHS - N (E.G., PRIMARY AND ONE OR MORE BACKUP PATHS) | SET OF ROUTES - N |

ENTRIES 439

PACKET SWITCHING LABEL ASSIGNMENT ACROSS MULTIPLE PACKET SWITCHING FORWARDING GROUPS

TECHNICAL FIELD

The present disclosure relates generally to communications and computer systems, especially, packet switching systems (e.g., routers).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Routers are communications devices used in a network to "route" packets through the network. Typically, routers exchange information, using routing protocols, to discover the topology of the network and to determine best paths for routing packets through the network. The exchanged information is typically stored in a Routing Information Base (RIB). A router then processes information in the RIB to determine how to forward packets from the router. Some routers, especially in a core network, may use label switching technology to simplify the forwarding decision of a packet. In such a scenario, a first router typically will provide to a second router: a different label to use for each different route, a different label to use for each customer edge router, and a different label to use for each virtual routing and forwarding domain (VRF). In processing a received packet that has such a label, the first router can readily identify the forwarding information for the packet, and forward it accordingly.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means associated with packet switching label assignment across multiple packet switching forwarding groups. In one embodiment, a packet switching device assigns a same particular packet switching label to each particular route of a plurality of particular routes having the same one or more best paths, wherein the plurality of particular routes includes routes from at least two different forwarding groups. The packet switching device advertises to other packet switching device(s) to add this same particular label to packets having one of the plurality of particular routes. The packet switching device then packet switches packets based on the particular label received in a label field in a header of these packets.

In one embodiment, the definition of a forwarding group includes a specific route. Therefore, the plurality of particular routes including routes from at least two different forwarding groups means that a same label is used for multiple different specific routes. Note, a route can be a fully specified address (e.g., 10.0.0.1 is a fully specified Internet Protocol version 4 address), or a prefix (e.g., 10.0.0.* or 10.0.0.0/24, which are the same Internet Protocol version 4 prefixes specifying all addresses whose first twenty-four bits are the same).

In one embodiment, the definition of a forwarding group includes routes associated with a same customer edge router. Therefore, the plurality of particular routes including routes from at least two different forwarding groups means that a same label is used for one or more routes from two different customer edge routers.

In one embodiment, the definition of a forwarding group includes routes associated with a single virtual routing and forwarding domain (VRF). Therefore, the plurality of particular routes including routes from at least two different forwarding groups means that a same label is used for one or more routes from two different virtual routing and forwarding domains (VRFs).

In one embodiment, a packet switching device receives, from a second packet switching device, a same particular packet switching label for each particular route of a plurality of particular routes having the same one or more best paths from the second packet switching device, wherein the plurality of particular routes includes routes from at least two different forwarding groups; wherein the forwarding group is defined as a specific route, one or more routes associated with a same customer edge router, or one or more routes associated with a single virtual routing and forwarding domain (VRF). The packet switching device sends a plurality of packets to the second packet switching device, with each particular packet of the plurality of packets including the particular label in a label field in a header of said particular packet; and wherein the plurality of packets includes one or more packets from at least two different forwarding groups.

2. Description

Disclosed are, inter alia, methods, apparatus, computer-storage media, mechanisms, and means associated with packet switching label assignment across multiple packet switching forwarding groups. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Finally, the term "particular machine," when recited in a method claim for performing steps, refers to a particular machine within the 35 USC §101 machine statutory class.

Figure 1:
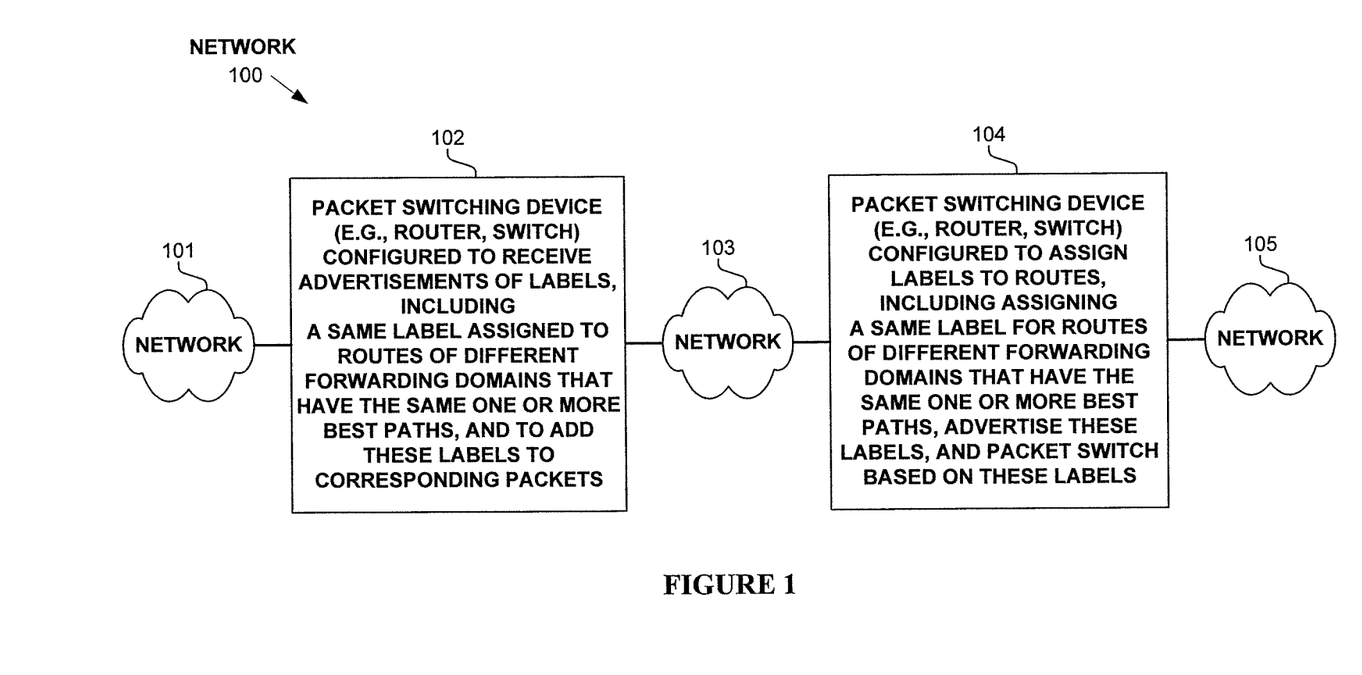
FIG. 1 illustrates a network operating according to one embodiment.

Disclosed are, inter alia, methods, apparatus, computer-storage media, mechanisms, and means associated with packet switching label assignment across multiple packet switching forwarding groups. Expressly turning to the figures, FIG. 1 illustrates a network 100 operating according to one embodiment. Illustrated are two packet switching devices 102 and 104, which are communicatively coupled via network 103, which allows packets received from networks 101 or 105, to be packet switched to the other network 105 or 101. Of course, networks used in the world are typically more complicated than network 100, and network 100 simply provides a context for understanding one or more embodiments.

In one embodiment, a packet switching device 104 assigns a same particular packet switching label to each particular route of a plurality of particular routes having the same one or more best paths, wherein the plurality of particular routes includes routes from at least two different forwarding groups. Determining the best path for a route is well-known in the art.

In one embodiment, the definition of a forwarding group includes a specific route. Therefore, the plurality of particular routes including routes from at least two different forwarding groups means that a same label is used for multiple different specific routes. Note, a route can be a fully specified address (e.g., 10.0.0.1 is a fully specified Internet Protocol version 4 address), or a prefix (e.g., 10.0.0.* or 10.0.0.0/24, which are the same Internet Protocol version 4 prefixes specifying all addresses whose first twenty-four bits are the same).

In one embodiment, the definition of a forwarding group includes routes associated with a same customer edge router. Therefore, the plurality of particular routes including routes from at least two different forwarding groups means that a same label is used for one or more routes from two different customer edge routers.

In one embodiment, the definition of a forwarding group includes routes associated with a single virtual routing and forwarding domain (VRF). Therefore, the plurality of particular routes including routes from at least two different forwarding groups means that a same label is used for one or more routes from two different virtual routing and forwarding domains (VRFs).

Packet switching device 104 then advertises to packet switching device 102 (and possibly other packet switching devices or networked devices) the assignment of the particular packet switching label with the plurality of particular routes so packets received from packet switching device 102 (and possibly other packet switching devices or networked devices) with the particular label can be packet switched based on the particular label. Packet switching device 104 then packet switches packets based on the particular label received in a label field in a header of these packets.

In one embodiment, the one or more best paths includes a primary path and one or more backup paths. In one embodiment, these packet switching labels are Multiprotocol Label Switching (MPLS) labels. In one embodiment, packet switching device 104 receives routing information for at least one of the plurality of routes via one or more routing protocol messages received from a remote packet switching device, possibly including packet switching device 102. In one embodiment, this routing protocol is Border Gateway Protocol (BGP) or Interior Gateway Routing Protocol (IGRP).

In one embodiment, the plurality of particular routes includes: a first plurality of particular routes and a second plurality of particular routes. Packet switching device 104, in response to said one or more best paths of the first plurality of particular routes becoming different than said one or more best paths of the second plurality of particular routes: assigns to each route of the first plurality of particular routes a second particular packet switching label, while the second plurality of particular routes remain assigned to the particular packet switching label. Packet switching device 104 then advertises the new labels to use, and then packet switches one or more received first packets based on the first particular label received in a label field in a header of said received first packets, while continuing to packet switch one or more received second packets based on the particular label received in a label field in a header of said received second packets. In one embodiment, the first plurality of routes has more routes than the second plurality of routes. In one embodiment, the second plurality of routes has more routes than the first plurality of routes.

In one embodiment, packet switching device 102 receives, from packet switching device 104, a same particular packet switching label for each particular route of a plurality of particular routes having the same one or more best paths from the second packet switching device, wherein the plurality of particular routes includes routes from at least two different forwarding groups. Packet switching device 102 sends a plurality of packets to the packet switching device 104, with each particular packet of the plurality of packets including the particular label in a label field in a header of said particular packet; and wherein the plurality of packets includes one or more packets from at least two different forwarding groups.

Figure 2:
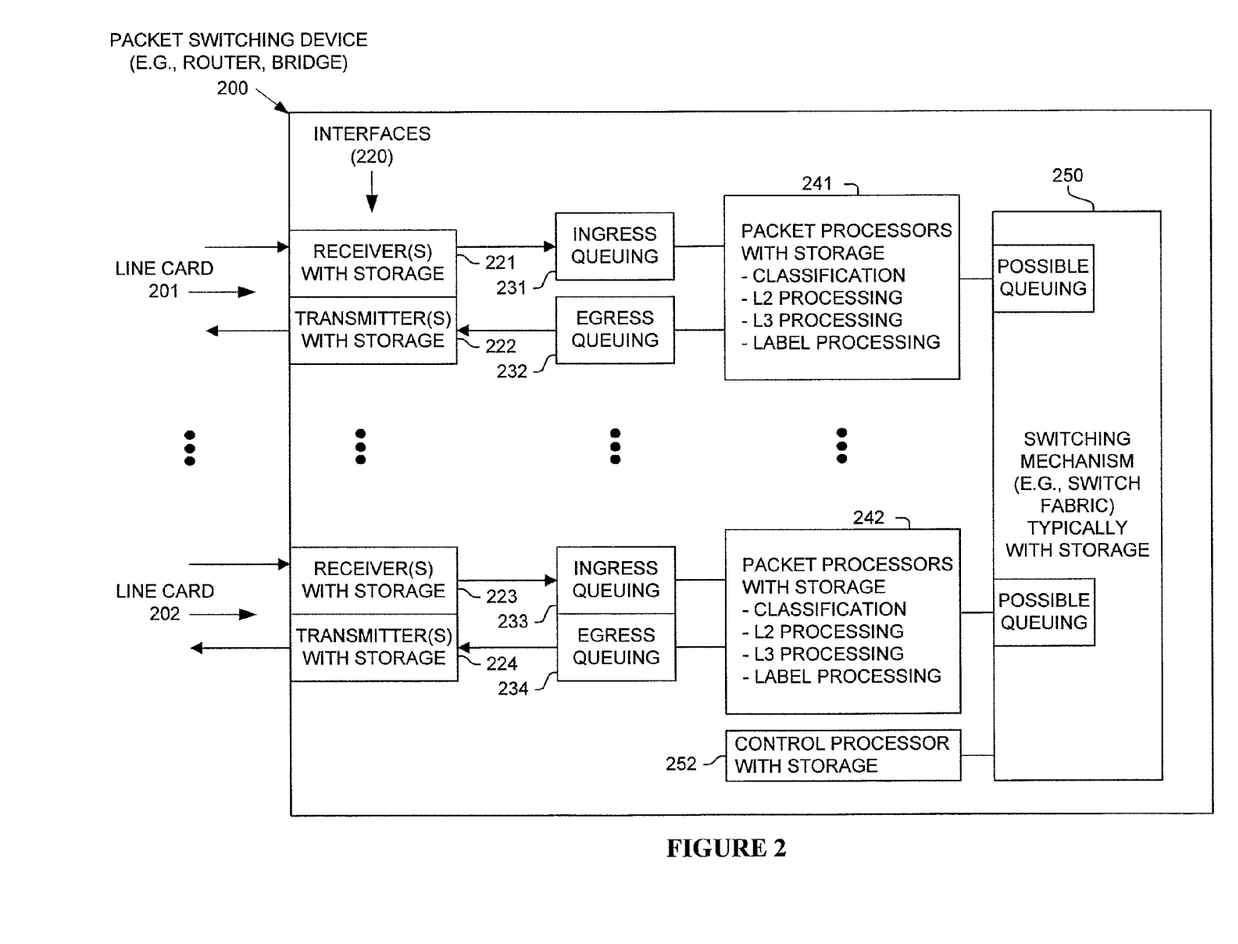
FIG. 2 illustrates a packet switching device operating according to one embodiment.

FIG. 2 illustrates an example of a packet switching device 200 of one embodiment. As shown, packet switching device 200 (e.g., router, bridge, etc.) comprises: line cards 201-202 which include ingress and egress interfaces (220), queuing (221-234), and packet processors with storage (241-242); switching mechanism 250 (e.g., switch fabric, bus, crossbar) which may include input or output queues (or possibly these queues are located elsewhere, such as on a line cards 201-202); and control processor with storage 252.

In one embodiment, control processor 252 assigns a same particular packet switching label to each particular route of a plurality of particular routes having the same one or more best paths, wherein the plurality of particular routes includes routes from at least two different forwarding groups. Control processor 252 then advertises to other packet switching device(s) to add this same particular label to packets having one of the plurality of particular routes. Control processor 252 also communicates these labels and appropriate forwarding information to packet processors 241-242, so that received packets with these labels in a label field in their header can be appropriately packet switched. Note, the operation of one embodiment will be described further in relation to FIGS. 4A-D.

In one embodiment, control processor 252 receives via advertisement messages (or receives via manual or other configuration procedure(s)), a same particular packet switching label for each particular route of a plurality of particular routes having the same one or more best paths from the second packet switching device. Control processor 252 communicates these associated routes and labels, as well as other appropriate forwarding information, to packet processors 241-242, so that one of these labels can be added to packets with one of these routes. Note, the operation of one embodiment will be described further in relation to FIGS. 5A-B.

Figure 3:
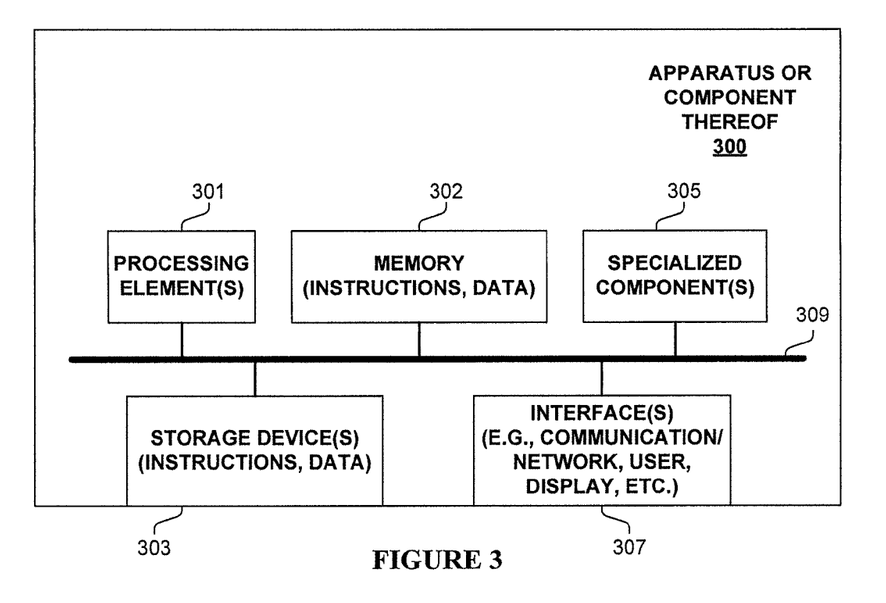
FIG. 3 illustrates an apparatus or component used in one embodiment.

FIG. 3 is block diagram of an apparatus or component 300 used in one embodiment associated with packet switching label assignment across multiple packet switching forwarding groups. In one embodiment, apparatus or component 300 performs one or more processes corresponding to one of the flow diagrams illustrated or otherwise described herein.

In one embodiment, apparatus or component 300 includes one or more processing element(s) 301, memory 302, storage device(s) 303, specialized component(s) 305 (e.g. optimized hardware such as for performing operations, etc.), and interface(s) 307 for communicating information (e.g., sending and receiving packets, user-interfaces, displaying information, etc.), which are typically communicatively coupled via one or more communications mechanisms 309, with the communications paths typically tailored to meet the needs of the application. In one embodiment apparatus or component 300 corresponds to, or is part of, packet switching device 102 or 104 of FIG. 1, and/or packet switching device 200 (e.g., entire packet switching device, packet processor 241-242, control processor 252) of FIG. 2.

Various embodiments of apparatus or component 300 may include more or less elements. The operation of apparatus or component 300 is typically controlled by processing element(s) 301 using memory 302 and storage device(s) 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element(s) 301 and/or data which is manipulated by processing element(s) 301 for implementing functionality in accordance with an embodiment. Storage device(s) 303 are another type of computer-readable medium, and typically comprise solid state storage media, disk drives, diskettes, networked services, tape drives, and other storage devices. Storage device(s) 303 typically store computer-executable instructions to be executed by processing element(s) 301 and/or data which is manipulated by processing element(s) 301 for implementing functionality in accordance with an embodiment.

Figure 4A:
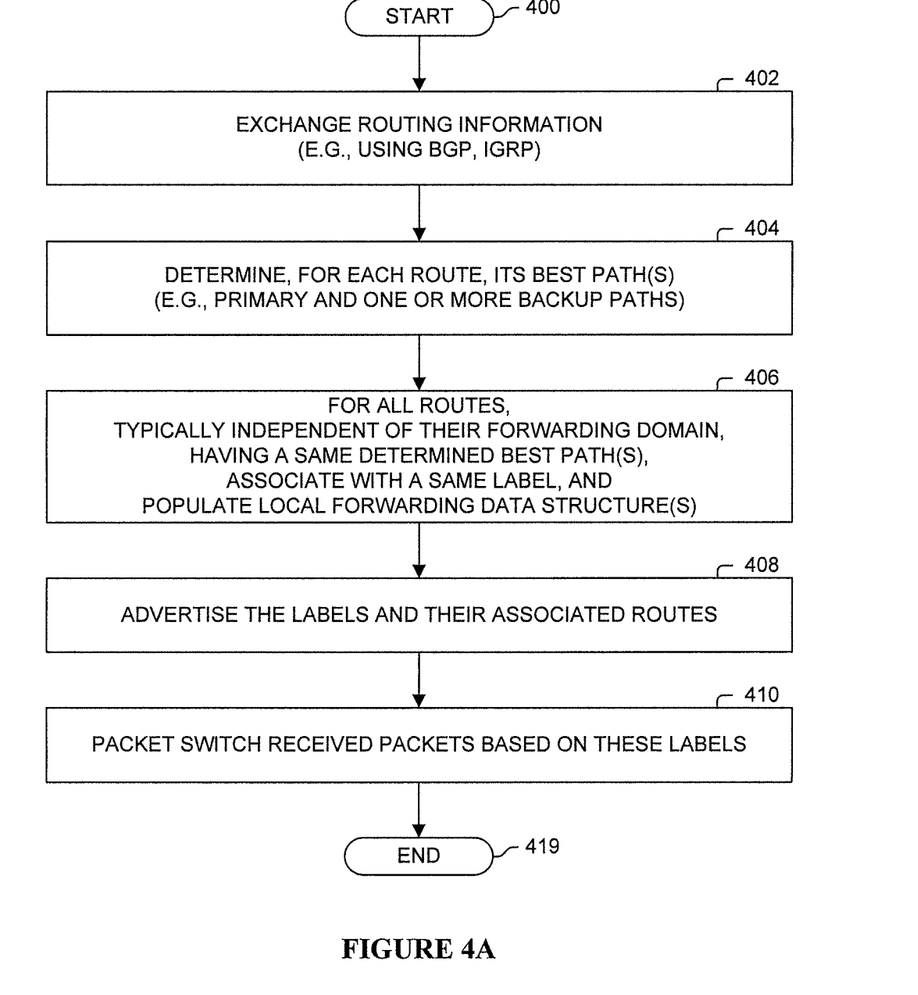
FIG. 4A illustrates a process, according to one embodiment, that includes assigning labels to routes.

FIG. 4A illustrates a process performed by a packet switching device of one embodiment. As shown, processing begins with process block 400, and proceeds to process block 402, wherein routing information is exchanged with other packet switching devices. In process block 404, the packet switching device determines the best path(s) for each route. In one embodiment, these best path(s) includes a single path. In one embodiment, these best paths include a primary path and one or more backup paths.

In process block 406, routes, typically independent of their forwarding domain, having a same determined best path(s), are assigned/associated with a same label. In doing so, one embodiment uses label assignment data structure 430 of FIG. 4B.

Figure 4B:
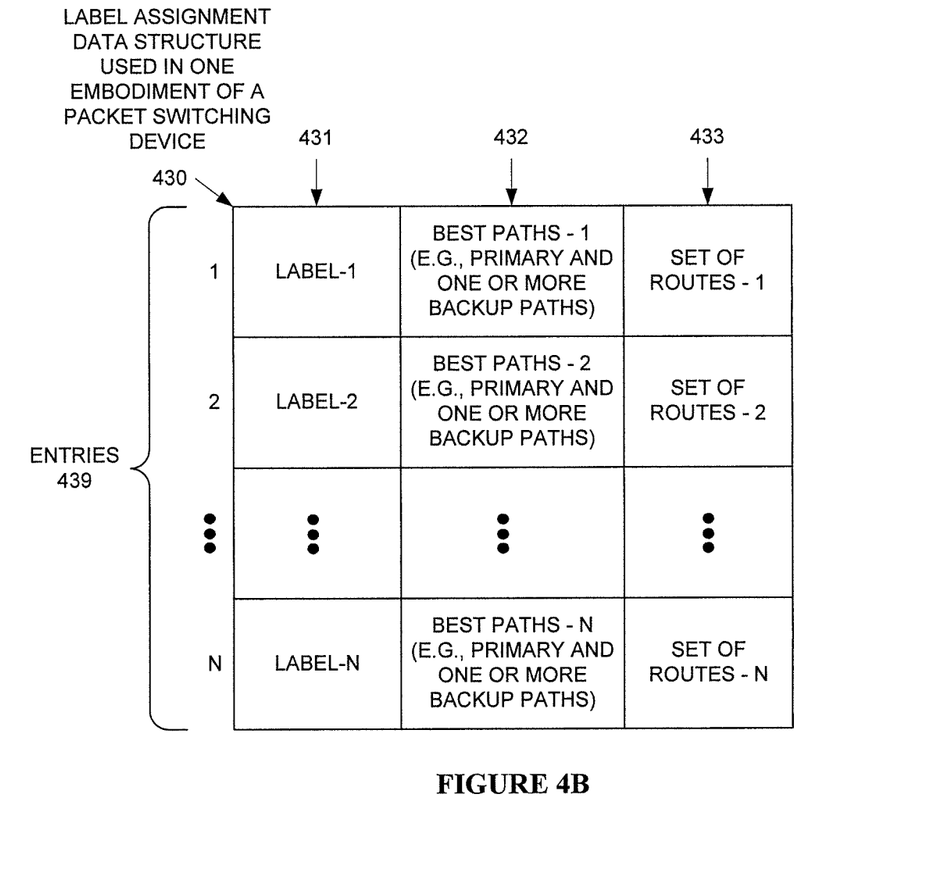
FIG. 4B illustrates a data structure used in assigning labels to routes according to one embodiment.

As shown, data structure 430 includes, for each entry of entries 439, a label field 431 specifying a label, an identification of the corresponding best path(s) 432, and one or more values (e.g., pointer to another data structure such as a linked list or array, explicit list of routes assigned to use the label in field 431) for identifying the set of routes assigned to use the label in field 431.

In one embodiment, this assignment of a particular label to a particular route is performed by searching data structure 430 for an entry (439) having a populated best path field 432 matching the determined particular best path(s) for the particular route. If an entry (439) is found, the route is added to the entry's set of routes (433). Otherwise, a new entry (439) is added to data structure 430, with a new label (431) assigned, with the best path field (432) populated with the particular best path(s) for the particular route, and set of routes field (433) updated to be/include the particular route.

Note, by assigning labels to routes having common best path(s) from multiple different forwarding groups, the number of labels required for use by a packet switching device may be greatly reduced, which may allow fewer resources (e.g., memory, lookup devices, processing power) to be required for packet processing (e.g., including forwarding) a received packet. Thus, it is advantageous over systems that assign labels only within a single forwarding group, as these systems typically use more labels, thus requiring more resources. Further, these labels may be stored in segregated or different data structures or lookup mechanisms, which may require a classification operation to first identify the corresponding forwarding group, from which the appropriate data structure in which to lookup the label is identified.

Figure 4C:
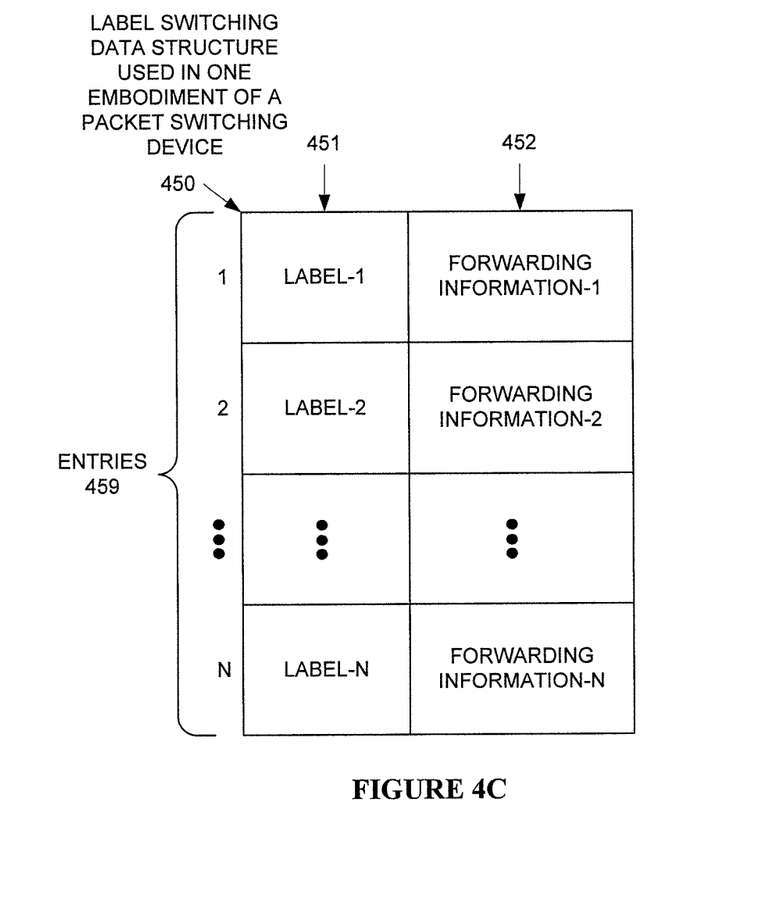
FIG. 4C illustrates a data structure used in determining forwarding information based on a label received in a packet according to one embodiment.

In one embodiment, a label switching data structure 450 of FIG. 4C is populated with the assigned label (in field 450) and corresponding forwarding information (in field 452) (e.g., possibly next hop, egress interface, a label to add, or other forwarding information), with an entry (459) for each label. Label switching data structure 450 can then be used for packet processing (e.g., including forwarding) of packets based on a corresponding label (451) in the header of a received packet. In one embodiment, a label switching data structure is populated for access to each packet processor, such as in, but not limited to, each of packet processors 241-242 of FIG. 2.

Returning to the processing of the flow diagram of FIG. 4A, in process block 408, the packet switching device advertises the assigned labels and their corresponding routes. In one embodiment, this advertisement is performed using BGP or a label distribution protocol (e.g., Label Distribution Protocol). Per process block 410, the packet switching device packet switches packets received with one of these assigned labels. Processing of the flow diagram of FIG. 4A is complete as indicated by process block 419.

Figure 4D:
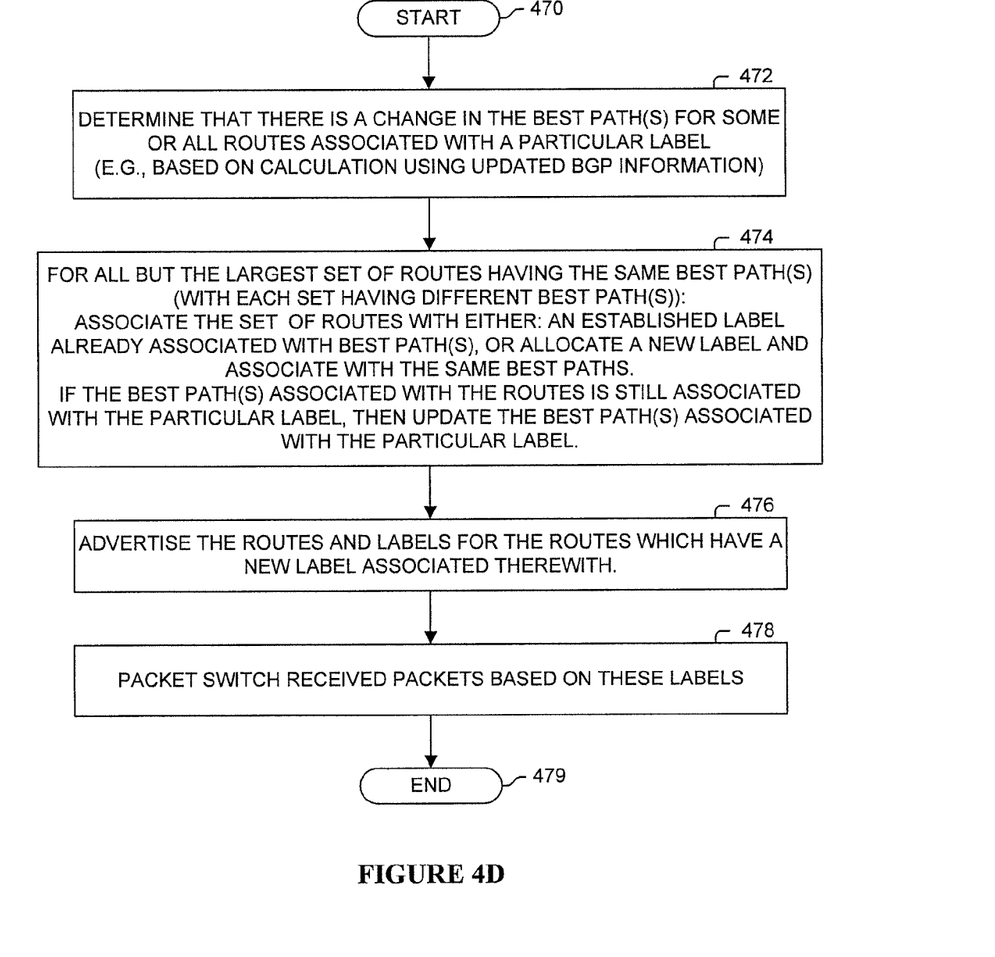
FIG. 4D illustrates a process, according to one embodiment, that includes updating assigned labels.

FIG. 4D illustrates a process performed in one embodiment. Processing begins with process block 470, and proceeds to process block 472, wherein a determination is made that there is a change in the best path(s) for some or all routes associated with a particular label (e.g., based on a best path calculation using updated routing information, such as, but not limited to, that received via BGP or IGRP).

Then, in process block 474, the label associated with all but the largest set of routes having the same best path(s) [with each set having different best path(s) associated therewith] is changed. [Note, one embodiment does not update the largest set of routes having the same best path(s) as this requires less work; while one embodiment updates the largest of routes having the same best path(s).]

In other words, previously, there was a single set of routes associated with the particular label, with all routes having the same best path(s). Now, after updating best path calculations based on updated routing information, there are now T sets of routes associated with the particular label, with (a) each of the T sets of routes having different best path(s) than any other of the T sets of routes, and (b) all routes within a set of the T sets of routes having the same best path(s). Therefore, each of T–1 sets of the T sets of routes must be assigned to a different label as they no longer have the same best path(s), and one set can remain associated with the same label. One embodiment leaves the set with the largest number of routes associated with the particular label, as this typically requires less updates to be advertised, and typically requires less updates to be applied to the label switching and label assignment data structures. In reassigning each set of the T–1 sets to a different label: if the best path(s) of all members of a set is already associated with an established label (e.g., search the label assignment data structure for a matching best path(s) entry), then assign all of this set's members to the established label; otherwise, allocate a new label and assign all of this set's members to the new label. During this process, the label assignment data structure is updated accordingly.

As determined in process block 475, if there are more labels that need updating [e.g., no longer all routes associated with a label have the same best path(s)], then in process block 476, the particular label is set to a different label that needs updating; and processing returns to process block 474 to update, as needed, the routes assigned to this particular label.

Otherwise, in process block 480, the updated information (routes and associated new labels) are advertised, and label switching data structures are updated, so these updated labels will be included in packets, and the packet switching device will packet switch these labels appropriately in process block 482. Processing of the flow diagram of FIG. 4D is complete as indicated by process block 489.

Figure 5A:
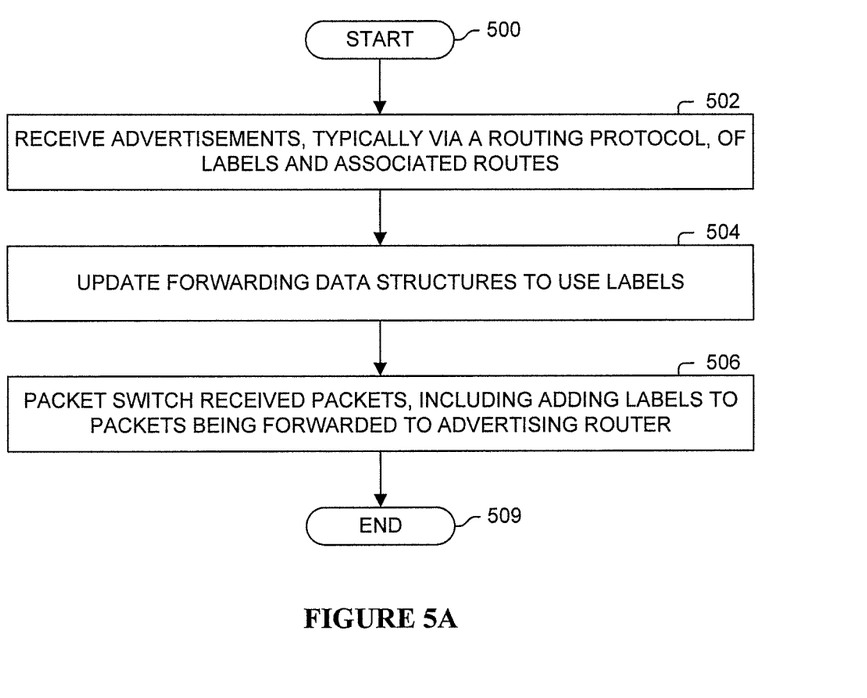
FIG. 5A illustrates a process, according to one embodiment, that includes receiving advertised labels for routes and adding these labels to packets being forwarded to the advertising packet switching device.

FIG. 5A illustrates a process performed by a packet switching device of one embodiment. As shown, processing begins with process block 500, and proceeds to process block 502, wherein advertisements of labels and their associated routes are received, including a same label used routes belonging to multiple forwarding groups. In process block 504, a forwarding data structure is updated to use these labels.

Figure 5B:
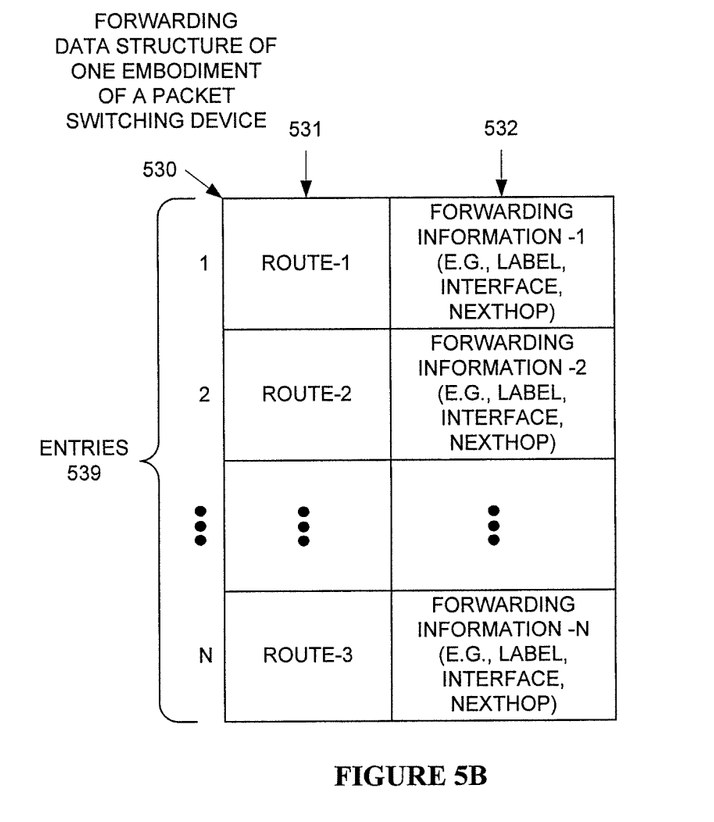
FIG. 5B illustrates a data structure used in determining a label to add to a packet being sent to a corresponding advertising packet switching device according to one embodiment.

One embodiment updates forwarding data structure 530 of FIG. 5B. As shown, forwarding data structure includes, for each entry (539), a route (531) and forwarding information (532) (e.g., assigned label, next hop and egress interface information). Thus, in packet switching a packet, the route of a packet can be used as the lookup key in forwarding data structure 530, to identify the assigned label to be added to the packet, as well as the egress information from which to send the packet, and the next hop information.

Returning to the processing of FIG. 5A, in process block 506, received packets are packet switched, which includes adding the corresponding assigned label to the packet, and forwarding the packet from the packet switching device. Processing of the flow diagram of FIG. 5A is complete as indicated by process block 509.

Note, in one embodiment, a networked device or other apparatus that is not a packet switching device uses these assigned labels in packets it sends to the packet switching device.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:
1. A method, comprising:
receiving, by a packet switching device, a route advertisement for each of a plurality of particular routes via a plurality of routing protocol messages received from one or more remote packet switching devices, with each said advertised route of the plurality of particular routes includes a prefix or a fully-specified address;

identifying that each particular said advertised route of the plurality of particular routes has a same one or more best paths from the packet switching device to a destination device;

assigning, by the packet switching device, a same particular packet switching label to each particular said advertised route of the plurality of particular routes based on said identifying that each particular route of the plurality of particular routes has the same one or more best paths from the packet switching device to the destination device, wherein the plurality of particular routes includes routes from at least two different forwarding groups;

advertising, by the packet switching device, the assignment of the particular packet switching label with the plurality of particular routes so packets received from one or more other packet switching devices with the particular packet switching label can be packet switched by the packet switching device based on the particular packet switching label; and packet switching, by the packet switching device, one or more received packets based on the particular packet switching label received in a label field of said received packets.

2. The method of claim 1, wherein a forwarding group of said at least two different forwarding groups is defined as a specific route.

3. The method of claim 1, wherein a forwarding group of said at least two different forwarding groups is defined as one or more routes associated with a same customer edge router.

4. The method of claim 1, wherein a forwarding group of said at least two different forwarding groups is defined as one or more routes associated with a single virtual routing and forwarding domain (VRF).

5. The method of claim 1, wherein said one or more best paths includes a primary path and one or more backup paths.

6. The method of claim 1, wherein the particular packet switching label is a Multiprotocol Label Switching (MPLS) label.

7. The method of claim 1, wherein said routing protocol messages are Border Gateway Protocol (BGP) or Interior Gateway Routing Protocol (IGRP) messages.

8. A method, comprising:

assigning, by a packet switching device, a same particular packet switching label to each particular route of a plurality of particular routes having the same one or more best paths from the packet switching device to a destination device, wherein the plurality of particular routes includes routes from at least two different forwarding groups, wherein the plurality of particular routes includes: a first plurality of particular routes and a second plurality of particular routes;

advertising, by the packet switching device, the assignment of the particular packet switching label with the plurality of particular routes so packets received from one or more other packet switching devices with the particular label can be packet switched based on the particular label; and packet switching, by the packet switching device, one or more received packets based on the particular label received in a label field in a header of said received packets; and in response to said one or more best paths of the first plurality of particular routes becoming different than said one or more best paths of the second plurality of particular routes: assigning to each route of the first plurality of particular routes a second particular packet switching label, while the second plurality of particular routes remain assigned to the particular packet switching label; and packet switching one or more received first packets based on the first particular label received in a label field in a header of said received first packets, while continuing to packet switch one or more received second packets based on the particular label received in a label field in a header of said received second packets.

9. The method of claim 8, wherein the first plurality of routes has more routes than the second plurality of routes.

10. The method of claim 8, wherein the second plurality of routes has more routes than the first plurality of routes.

11. The method of claim 8, wherein the forwarding group is defined as a specific route.

12. A packet switching device, comprising:

one or more processing elements; memory; a plurality of interfaces configured to sending and receive packets; and one or more packet switching mechanisms configured to packet switch packets among said interfaces;

where the packet switching device is configured to:

receive a route advertisement for each of a plurality of particular routes via a plurality of routing protocol messages received from one or more remote packet switching devices, with each said advertised route of the plurality of particular routes includes a prefix or a fully-specified address;

identify that each particular said advertised route of the plurality of particular routes has a same one or more best paths from the packet switching device to a destination device;

assign a same particular packet switching label to each particular said advertised route of the plurality of particular routes based on said identifying that each particular route of the plurality of particular routes has the same one or more best paths from the packet switching device to the destination device, wherein the plurality of particular routes includes routes from at least two different forwarding groups; wherein the forwarding group is defined as a specific route, one or more routes associated with a same customer edge router, or one or more routes associated with a single virtual routing and forwarding domain (VRF);

advertise the assignment of the particular packet switching label with the plurality of particular routes so packets received from other packet switching devices with the particular packet switching label can be packet switched by the packet switching device based on the particular packet switching label; and packet switch one or more packets, received on one or more of said interfaces, based on the particular packet switching label received in a label field of said received packets.

13. The packet switching device of claim 12, wherein said one or more best paths includes a primary path and one or more backup paths.

14. A packet switching device, comprising:

one or more processing elements;

memory;

a plurality of interfaces configured to sending and receive packets; and one or more packet switching mechanisms configured to packet switch packets among said interfaces;

wherein said one or more processing elements are configured to assign a same particular packet switching label to each particular route of a plurality of particular routes having the same one or more best paths from the packet switching device to a destination device, wherein the plurality of particular routes includes routes from at least two different forwarding groups; wherein the forwarding group is defined as a specific route, one or more routes associated with a same customer edge router, or one or more routes associated with a single virtual routing and forwarding domain (VRF);

wherein the packet switching device is configured to advertise the assignment of the particular packet switching label with the plurality of particular routes so packets received from other packet switching devices with the particular label can be packet switched based on the particular label; and wherein the packet switching device is configured to packet switch one or more packets, received on one or more of said interfaces, based on the particular label received in a label field in a header of said received packets;

wherein the plurality of particular routes includes: a first plurality of particular routes and a second plurality of particular routes; and wherein said one or more processing elements are configured to: in response to said one or more best paths of the first plurality of particular routes becoming different than said one or more best paths of the second plurality of particular routes: assigning to each route of the first plurality of particular routes a second particular packet switching label, while the second plurality of particular routes remain assigned to the particular packet switching label; and wherein the packet switching device is configured to packet switch one or more received first packets based on the first particular label received in a label field in a header of said received first packets, while continuing to packet switch one or more received second packets based on the particular label received in a label field in a header of said received second packets.

15. The packet switching device of claim 14, wherein the first plurality of routes has more routes than the second plurality of routes.

16. The packet switching device of claim 14, wherein the second plurality of routes has more routes than the first plurality of routes.

17. The packet switching device of claim 12, wherein a forwarding group of said at least two different forwarding groups is defined as a specific route.

18. The packet switching device of claim 12, wherein a forwarding group of said at least two different forwarding groups p is defined as one or more routes associated with a same customer edge router.

19. The packet switching device of claim 13, wherein a forwarding group of said at least two different forwarding groups is defined as one or more routes associated with a single virtual routing and forwarding domain (VRF).

20. The packet switching device of claim 12, wherein the same particular packet switching label is Multiprotocol Label Switching (MPLS) label.

21. The packet switching device of claim 12, wherein said routing protocol messages are Border Gateway Protocol (BGP) or Interior Gateway Routing Protocol (IGRP) messages.

* * * * *

UNITED STATES PATENT AND TRADEMARK OFFICE
CERTIFICATE OF CORRECTION

Page 1 of 1

PATENT NO.      : 9,094,335 B2
APPLICATION NO. : 13/031746
DATED           : July 28, 2015
INVENTOR(S)     : Subramanian et al.

It is certified that error appears in the above-identified patent and that said Letters Patent is hereby corrected as shown below:

In the claims,

Col. 12, Claim 19, line 1, "claim 13" should be -- claim 12 --

Signed and Sealed this
First Day of March, 2016

Michelle K. Lee
*Director of the United States Patent and Trademark Office*